April 10, 1962     J. C. BRENEMAN     3,028,616

GROUND CLEANING APPARATUS

Filed Oct. 12, 1959     2 Sheets-Sheet 1

INVENTOR.
JAMES C. BRENEMAN
BY
Woodhams Blanchard and Flynn
ATTORNEYS

April 10, 1962 J. C. BRENEMAN 3,028,616
GROUND CLEANING APPARATUS
Filed Oct. 12, 1959 2 Sheets-Sheet 2
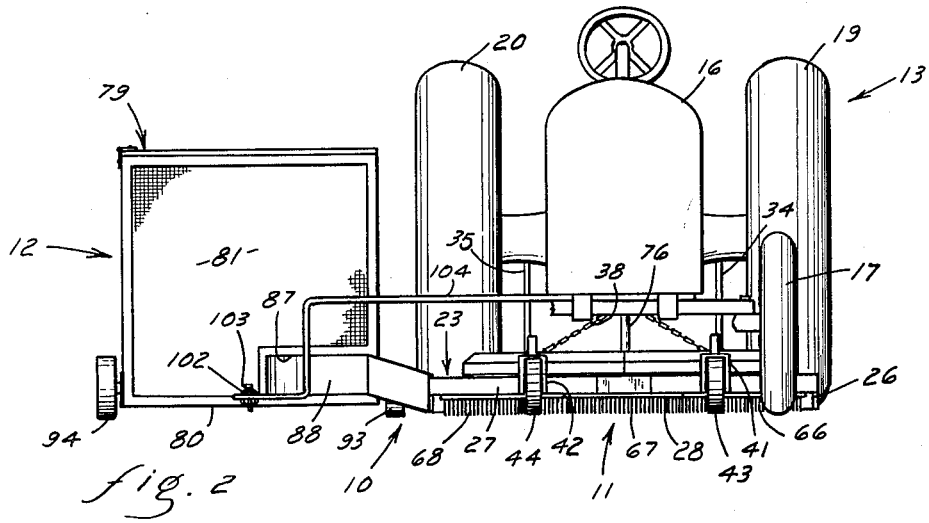
INVENTOR.
JAMES C. BRENEMAN
BY
Woodhams, Blanchard and Flynn
ATTORNEYS United States Patent Office 3,028,616
Patented Apr. 10, 1962

3,028,616
GROUND CLEANING APPARATUS
James C. Breneman, Galesburg, Mich., assignor to Innoventions, Inc., Kalamazoo, Mich., a corporation of Michigan
Filed Oct. 12, 1959, Ser. No. 845,946
6 Claims. (Cl. 15—87)

This invention relates in general to a ground cleaning apparatus and, more particularly, to a type thereof including structure defining a compartment for collecting leaves and the like in combination with a sweeping device for removing said leaves from the surface of the ground and moving said leaves into said compartment.

It is well known that certain types of materials, such as leaves, grass, snow and the like, often accumulate rapidly and undesirably upon the ground during certain times of the year. For example, persons charged with the responsibility for maintaining large parks and golf courses are acutely aware of the large quantities of leaves which accumulate upon the ground during the fall season. If these leaves are not removed, they are unsightly and they damage the grass. Moreover, on golf courses the leaves often hide the golf ball from view.

Many efforts have been made to provide self-propelled or semi-self-propelled devices which remove the leaves from the ground and collect them as they are removed, and some costly machines have been developed for this purpose. However, it is not unusual to see a large group of workmen manually raking and removing large accumulations of leaves in parks. Because of the high cost of using manual labor for such purposes and, further, because of the high initial cost of machine operated equipment presently available for this purpose, very little is done about removal of such leaves from most golf courses and many parks.

Although the problem of removing leaves from golf courses and large parks has been discussed above by way of example, it will be recognized that the same problem exists to a lesser degree in small park areas and even on large residential or institutional lawns. Moreover, it will also be recognized that a similar problem exists with respect to the removal of freshly cut grass on large lawn areas as well as the removal of small amounts of snow, particularly in parking lots. Thus, it will be apparent that the hereinafter disclosed invention will be applicable to a variety of different uses in addition to those mentioned above.

Accordingly, the primary object of this invention has been the provision of an apparatus for removing relatively light materials, such as grass, leaves and light snowfalls, from the surface of the ground and simultaneously collecting the materials as they are removed for deposit in a selected location.

A further object of this invention has been the provision of an apparatus, as aforesaid, whereby said materials may be quickly and efficiently removed from very large areas in a short period of time by any person who is capable of operating a conventional tractor.

A further object of this invention has been the provision of an apparatus, as aforesaid, which is extremely simple in operation, which can be provided in part by conversion of a standard piece of equipment, to which a relatively inexpensive and equally simple, through ingenious, collecting structure is added.

A further object of this invention has been the provision of an apparatus, as aforesaid, which can be connected to a tractor without special tools or special knowledge by any person capable of operating a tractor, which is relatively inexpensive to build and which requires very little maintenance.

Other objects and purposes of this invention will become apparent to persons familiar with this type of equipment upon reading the following specifications and examining the accompanying drawings, in which:

FIGURE 2 is a broken, front elevational view of said apparatus in association with a said tractor.

FIGURE 4 is a sectional view taken along the line IV—IV in FIGURE 1.

FIGURE 5 is a sectional view taken along the line V—V in FIGURE 4.

For convenience in description, the terms "front," "rear," "upper," "lower" and derivatives thereof, or words of similar import, will have reference to the apparatus of the invention when in its normal operating position in association with a self-propelled vehicle, as shown in FIGURE 2. The terms "inner," "outer," and derivatives thereof will have reference to the geometric center of said apparatus and parts thereof.

General Description

The objects and purposes of this invention, including those set forth above, have been met by providing a ground cleaning apparatus comprising device, which is supported upon and operated by a self-propelled vehicle for sweeping or removing leaves and the like from the ground, in combination with a frame structure defining a compartment connected to said sweeping device for collecting the materials removed from the ground. The ground sweeping device includes a relatively flat, downwardly opening hood in which a plurality of elongated brush members are supported for rotation around spaced, vertical axes. The brush members are arranged so that their brushing elements define a susbtantially horizontal plane which, during operation of the apparatus, is adjacent to the ground.

The collecting structure is comprised of a substantially rectangular frame which is supported upon wheels and which has walls, some of which are perforated, defining a compartment. The frame structure is separably connected to the self-propelled vehicle, such as a tractor, by linkage for movement of said structure alongside of said vehicle. The compartment is connected to the hood by a duct which enters the side of the hood and the front of the compartment. The collecting structure has a hinged top wall and sliding rear wall for easy removal of the leaves or other materials therefrom.

The brush members are arranged in the hood so that they rotate as the vehicle moves them across the surface of the ground. The leaves or the like, which are removed from the ground, are driven by the rotating brushes through the duct into the compartment.

Detailed Construction

Figure 1:
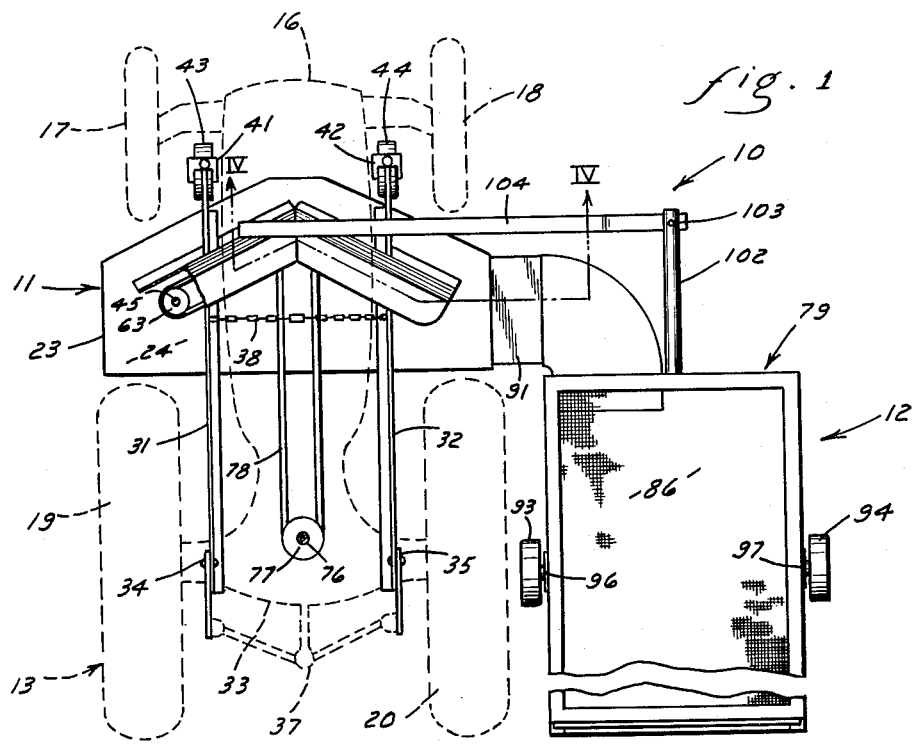
FIGURE 1 is a top plan view of an apparatus embodying the invention and including a broken line showing of a conventional tractor for supporting and moving said apparatus.

The ground cleaning apparatus 10 (FIGURES 1 and 2), which has been selected to illustrate a preferred embodiment of the invention, is comprised of a ground sweeping device 11 and a materials collecting structure 12, both of which are connected to and operated by a self-propelled vehicle, such as the tractor 13. The tractor 13 may be of a substantially conventional, four wheeled type having a body 16, a pair of spaced front wheels 17 and 18 and a pair of rear wheels 19 and 20.

The sweeping device 11 (FIGURES 1 and 4) is comprised of a relatively flat hood 23 having a substantially horizontal top wall 24 and a downwardly projecting peripheral wall 26 which extends completely around the top wall 24, except at the rightward end (FIGURE 5) where an opening 25 is provided therein. As shown in FIGURE 2, the front portion 27 of said peripheral wall 26 is substantially reduced in downward extent for the purpose of permitting materials, such as leaves and grass, to pass under the lower edge 28 thereof.

A pair of elongated, substantially parallel structure members, such as the angles 31 and 32 (FIGURE 1), are secured, as by welding, to the upper surface of the top wall 24 and extend rearwardly therefrom to points beneath or beyond the rear axial housing 33 of the tractor 13. The rearward ends of the angles 31 and 32 may be connected by the vertical bars 34 and 35 to lift mechanism 37 of a conventional type which is supported upon the rear end of the tractor 13. A chain 38 is secured to and extends between the angles 31 and 32 near the frontward ends thereof for connecting the front end of the sweeping device 11 to the lower side of the tractor 13 near its front end.

Casters 41 and 42 (FIGURE 1) having wheels 43 and 44 are mounted upon the front end of the hood 23 near the front ends of the angles 31 and 32 so that said wheels 43 and 44 are spaced from and disposed between the front wheels 17 and 18 of the tractor 13. The chain 38 permits the wheels 43 and 44 to engage the ground, but also causes the device 11 to follow the direction of movement of the tractor 13.

The sweeping device 11 includes three spaced and axially vertical spindles 45 (FIGURE 1) and 46 and 47 (FIGURE 4), which extend through, and are rotatably supported upon, the top wall 24 of the hood 23. The spindles 45, 46 and 47, which are preferably identical in structure, may be similarly mounted upon said hood 23 by means such as the bearing assemblies 53 and 54 which support the spindle 46. The thrust bearing 53 includes a bearing cone 48 which is integral with the spindle 46, the bearing balls 49 and bearing ball retainer ring 52 which is supported upon the top wall 24. The radial bearing assembly 54 includes a bearing ball retainer 55 which is secured to the lower side of the top wall 24 for engaging the adjacent portion of the spindle 46. A cup-shaped bearing shield 56 has a central opening which snugly encircles the spindle 46 beneath the radial bearing 54 and extends upwardly to, but is slightly spaced from, the lower surface of the top wall 24. The bearing shield 56 also serves as a retainer collar, to limit upward movement of the spindle 46 with respect to the hood 23. It will be recognized that other types of spindle and bearing constructions will be satisfactory for this use and, therefore, the above specific description is for illustrative purposes only.

The lower end of the spindle 46 has a coaxial, threaded opening 57 for reasons appearing hereinafter. A three grooved pulley 58 is coaxially mounted upon, and is rotatable with, the upper end of the spindle 46 in a substantially conventional manner.

The spindles 45 and 47 are rotatably supported upon the top wall 24 by means of thrust and radial bearing assemblies in substantially the same manner as set forth above with respect to the spindle 46. As shown in FIGURE 4, a single groove pulley 59 is supported upon, and is rotatable with, the upper end of the spindle 47. The pulley 59 is operably connected to the pulley 58 by a belt 62. A pulley 63 (FIGURE 1) on the spindle 45 is operably connected to the pulley 58 (FIGURE 4) by a belt 64. Accordingly, rotation of the center spindle 46 in one rotational direction is transmitted by the belts 62 and 64 to the pulleys 59 and 63, respectively, to effect a corresponding rotation of said spindles 47 and 45, respectively.

Three brushes 66, 67 and 68 (FIGURE 2), which are preferably, but not necessarily, identical in construction, are mounted upon and rotatable with the lower ends of the spindle 45, 46 and 47, respectively. More specifically, and as shown for example in FIGURE 4, the center brush 67 has an elongated back member 71 with a plurality of brush elements or bristles 72 extending substantially uniform both in density and distance from said back member 71, in a substantially conventional manner. Said back member 71 has a transverse opening 73 midway between its ends through which a bolt 74 is slidably receivable for threaded reception into the threaded opening 57 in the spindle 46. In this manner the back member 71 hence the brush 67 is tightly held against the spindle 46 for rotation therewith. In a similar manner, the brushes 66 and 68 are similarly constructed and held with respect to their spindles 45 and 47, respectively.

A vertical power take-off shaft 76 (FIGURES 1 and 2) extends downwardly from the body 16 of the tractor 13 near the rearward end thereof and is rotated by the engine of said tractor in a substantially conventional manner. A pulley 77, which is supported upon and rotatable with the lower end of the power shaft 76, is connected by a belt 78 to the pulley 58 on the center spindle 46. Accordingly, the spindles 45, 46 and 47 are simultaneously rotated in response to rotation of the power take-off shaft 76.

The collecting structure 12 (FIGURE 3) has a substantially rectangular frame 79 which includes a bottom wall 80, a front wall 81, rear wall 82, side walls 83 and 84, and a top wall 86. The bottom wall is preferably imperforate and substantially rigid, whereas the remaining walls are preferably perforate. More specifically, and for example, the bottom wall 80 may be a sheet of plywood and the remaining walls may be comprised of rectangularly arranged frame elements covered by sheets of heavy screening. The walls of said frame 79 define a substantially rectangular compartment 89 in which the materials, such as leaves, are deposited by the sweeping device 11.

The front wall 81 has an opening 87 near the lower edge thereof through which an elbow 88 extends for communication with the compartment 89. The outer end of the elbow 88, which opens toward the tractor 13, is connected to a duct 91 which is secured to the hood 23 and communicates with the opening 25 (FIGURE 5) in the peripheral wall 26 at the rightward end of the hood 23.

Figure 3:
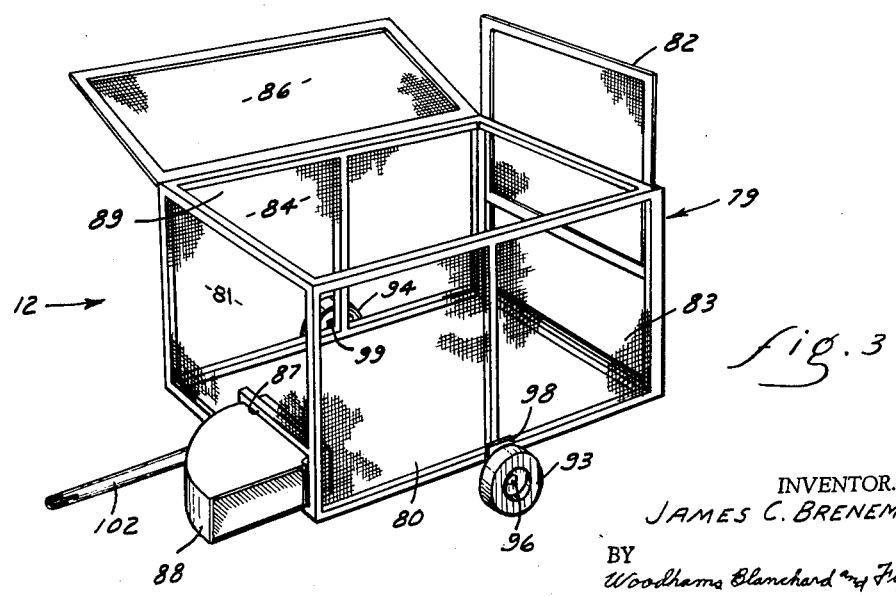
FIGURE 3 is a perspective view of the collecting structure of said apparatus.

The bottom wall, the front wall and the two side walls are preferably held substantially rigidly with respect to each other. The rear wall 82 is vertically slidably supported upon and between the rear ends of the side walls 83 and 84 so that the materials collected in the structure 12 can be emptied through the rear end thereof. The top wall 86 is preferably hingedly supported upon the upper edge of one of the side walls, here the side wall 84. Accordingly, the top wall 86 can be raised for the purpose of facilitating the removal of the materials from the compartment 89 through the rear end thereof when the rear wall 82 is in the raised position, as shown in FIGURE 3.

The frame 79 of the collecting structure 12 is supported on opposite sides thereof by the coaxial wheels 93 and 94, which are preferably disposed about midway between the front and rear ends of said frame. More specifically, the wheels 93 and 94 are supported upon the stub shafts 96 and 97 which are in turn supported upon the frame 79 adjacent to the bottom wall 80 by means of the plates 98 and 99. A tongue 102 is secured to and extends frontwardly from the front end of the frame 79 adjacent to the bottom wall 80 thereof. The front end of the tongue 102 is pivotally connected by the pin 103 to the outer end of a bar 104 which is rigidly, but releasably, mounted upon the body 16 of the tractor 13 and extends sidewardly therefrom.

*Operation*

With the ground cleaning apparatus 10 (FIGURES 1 and 2) assembled as described above and associated with the tractor 13, operation is effected simply by starting the engine of the tractor and, in a conventional manner, causing the power shaft 76 to rotate as the tractor 13 is moved along the ground with the sweeping device 11 adjacent to the surface thereof. More specifically, rotation of the power shaft 76 by the engine of the tractor 13 operates through the belt 78, the pulleys associated therewith and the belts and pulleys mounted upon the hood 23 effect rotation of the spindles 45, 46 and 47 in the same rotational direction. In this particular embodiment, rotation of the brushes 66, 67 and 68, which are secured to said spindles, is in the clockwise direction as viewing the apparatus 10 in FIGURE 1. Accordingly, the materials, such as leaves, disposed upon the ground are engaged by the brushes and driven at a relatively high velocity toward the rightward end of the hood 23. Said leaves pass through the opening 25 in the peripheral wall 26, through the elbow 88 and into the compartment 89.

The castered wheels 43 and 44 on the sweeping device 11, and the pivotal connection of the tongue 102 with the bar 104 facilitate movement of the apparatus 10 along the ground with the tractor 13 as it is turned. The duct 91 may be resiliently flexible to facilitate adjustments in the position of said collecting structure 12 with respect to the tractor 13 during such turning movements.

When the apparatus 10 is operated as set forth above, the sweeping action of the device 11 is equally effective upon a dirt surface, in the grass or upon the pavement. The apparatus 10 will operate very effectively in removing and collecting leaves, grass, papers and similar dry materials. The apparatus will also effectively remote semi-moist materials, such as a light fall of relatively dry snow, particularly from a paved area.

Although a particular preferred embodiment of this invention has been disclosed above for illustrative purposes, it will be understood that variations or modifications of such disclosure, which lie within the scope of the appended claims, are fully contemplated.

What is claimed is:

1. In an apparatus mountable upon a wheeled vehicle for removing and collecting relatively light materials from the surface supporting said vehicle, the combination comprising: a downwardly and sidewardly opening hood; means for supporting said hood upon said vehicle; a plurality of brushes rotatably supported upon and within said hood for rotation around spaced, upright axes, said brushes having bristles defining a substantially horizontal plane positionable adjacent to the surface supporting said vehicle; a wheeled structure having walls defining a compartment, some of said walls being perforate; means connecting said structure to said vehicle for movement thereby; duct means connected to the sideward opening in said hood and communicating with said compartment; and means for rotating said brushes whereby said materials encountered by said brushes as said apparatus moves along said surface are moved through said duct means into said compartment.

2. An apparatus for removing and collecting materials from the ground, comprising: a self-propelled, wheeled vehicle; downwardly opening hood means supported upon said vehicle for movement into a position adjacent to the surface supporting said vehicle, said hood means having a sideward opening; a plurality of elongated brush members; means supporting said brush members within said hood for rotation around spaced, vertical axes, the lower edges of said brush members being disposed substantially within a horizontal plane adjacent to said surface when said hood is in said position; frame structure defining a compartment, some of the walls of said compartment being perforate; wheel means supporting said frame structure upon said surface; linkage connecting said frame structure to said wheeled vehicle for movement therewith; and duct means connecting said sideward opening of said hood with said compartment whereby rotation of said brush members while said apparatus is moved along said surface causes said materials to be engaged by said brush members and to be moved through said duct into said compartment.

3. An apparatus supportable upon a tractor for removing and collecting leaves and the like from the ground, comprising: a relatively flat hood having a top wall and a peripheral wall, said peripheral wall being of relatively short downward extent along the front edge thereof and having a sideward opening therein; means for supporting said hood in a substantially horizontal position upon and beneath said tractor and adjacent to the ground; a plurality of elongated brushes supported upon and within said hood for rotation around spaced, vertical axes, said brushes having bristles extending from one side thereof, the free ends of said bristles defining a substantially horizontal plane parallel with and adjacent to said ground when said hood is in said position; means connecting said brushes to said tractor for rotation thereby; rectangular frame structure having walls defining a closed compartment, some of said walls being perforate, said walls including a vertically slidable rear wall and a hinged top wall; wheel means for supporting said frame structure upon the ground; linkage including a tongue on said frame structure connecting said frame structure to the tractor for movement thereby; duct means connected to said opening in said peripheral wall and communicating with said compartment through the front wall thereof, whereby rotation of said brushes while said apparatus is moved along the ground causes the leaves and the like adjacent the front edge of said hood to move through said duct means into said compartment.

4. The apparatus of claim 1 wherein there are three brushes arranged to rotate in the same rotational direction and thereby effect said movement of said materials through said duct means.

5. The apparatus of claim 1 wherein at least one of the walls of said compartment is movable with respect to the remaining walls of said compartment for removing the materials from said compartment.

6. The apparatus of claim 1 wherein said hood is beneath said wheeled vehicle; wherein said wheeled compartment is close to said hood and said duct means is connected to said compartment near the front end thereof.

References Cited in the file of this patent
UNITED STATES PATENTS

| | | |
|---|---|---|
| 993,603 | Jones | May 30, 1911 |
| 2,834,034 | Angell | May 13, 1958 |